(12) United States Patent
Lienhard et al.

(10) Patent No.: US 11,913,177 B2
(45) Date of Patent: Feb. 27, 2024

(54) RAIL FASTENING SYSTEM

(71) Applicant: SCHWIHAG AG, Tägerwilen (CH)

(72) Inventors: Stefan Lienhard, Constance (DE); Frank Meyer, Stockach (DE)

(73) Assignee: SHIWIHAG AG, Tägerwilen (CH)

( * ) Notice: Subject to any disclaimer, the term of this patent is extended or adjusted under 35 U.S.C. 154(b) by 898 days.

(21) Appl. No.: 16/960,919

(22) PCT Filed: Jan. 8, 2019

(86) PCT No.: PCT/EP2019/050327
§ 371 (c)(1),
(2) Date: Jul. 9, 2020

(87) PCT Pub. No.: WO2019/137905
PCT Pub. Date: Jul. 18, 2019

(65) Prior Publication Data
US 2020/0332474 A1 Oct. 22, 2020

(30) Foreign Application Priority Data
Jan. 11, 2018 (DE) ...................... 10 2018 100 554.7

(51) Int. Cl.
*E01B 9/38* (2006.01)
*E01B 9/18* (2006.01)
*E01B 9/28* (2006.01)
*F16B 2/06* (2006.01)

(52) U.S. Cl.
CPC .................. *E01B 9/38* (2013.01); *E01B 9/18* (2013.01); *E01B 9/28* (2013.01); *E01B 2204/09* (2013.01); *F16B 2/065* (2013.01)

(58) Field of Classification Search
CPC ..... E01B 9/18; E01B 9/28; E01B 9/38; E01B 2204/09; F16B 2/065
See application file for complete search history.

(56) References Cited

U.S. PATENT DOCUMENTS

| 5,332,153 | A | 7/1994 | Leibhard et al. |
| 2010/0301126 | A1 | 12/2010 | Meyer |
| 2011/0068185 | A1 | 3/2011 | Bösterling et al. |
| 2011/0262241 | A1 | 10/2011 | Bosterling et al. |
| 2013/0056545 | A1 | 3/2013 | Danneberg et al. |
| 2015/0211190 | A1 | 7/2015 | Harraßet al. |
| 2016/0230352 | A1 | 8/2016 | Bednarczyk et al. |

(Continued)

FOREIGN PATENT DOCUMENTS

| CN | 2661748 | 12/2004 |
| CN | 201148574 | 11/2008 |
| CN | 102245836 A | 11/2011 |

(Continued)

*Primary Examiner* — Robert J McCarry, Jr.
(74) *Attorney, Agent, or Firm* — Smartpat PLC

(57) ABSTRACT

Rail fastening system (1) for fastening a rail (2) to a rail subsurface, preferably for a ballastless track, comprising a base plate (10), preferably made of a plastic, and at least one dowel (20), wherein the base plate (10) has at least one opening (15), which completely penetrates the base plate (10) in the thickness direction, and the dowel (20) is introduced into the opening (15), is held therein by means of a retaining contour and projects in the thickness direction at least on one side beyond the base plate (10).

18 Claims, 2 Drawing Sheets

(56) References Cited

U.S. PATENT DOCUMENTS

2017/0321382 A1  11/2017  Olbrich et al.

FOREIGN PATENT DOCUMENTS

| | | |
|---|---|---|
| CN | 202323578 U | 7/2012 |
| CN | 103038421 A | 4/2013 |
| CN | 205134109 U | 4/2016 |
| CN | 205688283 U | 11/2016 |
| DE | 277305 A1 | 3/1990 |
| DE | 10148726 A1 | 4/2003 |
| DE | 102005024600 A1 | 11/2006 |
| DE | 102011103127 A1 | 12/2011 |
| DE | 202015103972 U1 | 10/2016 |
| EP | 0462436 A1 | 12/1991 |
| EP | 2851468 A1 | 3/2015 |
| ES | 2070619 | 6/1995 |
| JP | 2010529328 A | 8/2010 |
| JP | 2013526665 A | 6/2013 |
| RU | 103365 U1 | 4/2011 |
| UA | 65445 A | 3/2004 |
| WO | 2011032969 A1 | 3/2011 |
| WO | 2015040118 A1 | 3/2015 |
| WO | 2017215757 A1 | 12/2017 |
| WO | WO-2017215757 A1 * 12/2017 ............... E01B 9/38 |

\* cited by examiner

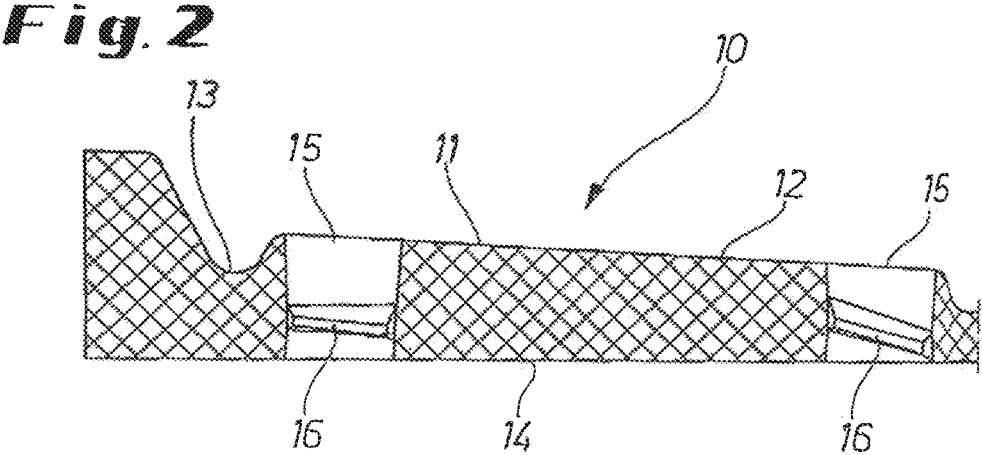
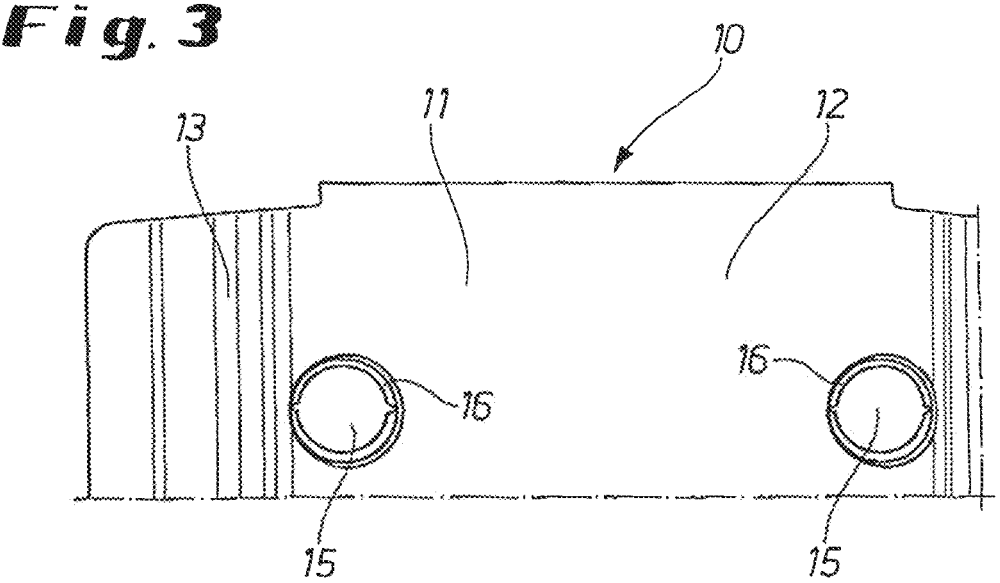

RAIL FASTENING SYSTEM

TECHNICAL FIELD

The disclosure relates to a rail fastening system for fastening a rail to a rail subsurface, preferably for a ballastless track, which comprises a base plate with at least one opening and at least one dowel which is introduced into the opening. The disclosure also relates to a method for manufacturing a rail fastening system.

BACKGROUND

Base plates are used to fasten a rail to a rail subsurface for a ballastless track. These can, for example, be designed as mounting plates, system frames or inclination plates.

DE 20 2015 103 972 U1 so describes a mounting plate equipped with dowels for locking in a concrete bed and for mounting rail holding devices. The mounting plate has a bearing surface on the underside for connecting to a support structure. For the pre-mounting of a dowel (analogously several dowels) on the mounting plate, the dowel head is introduced from the side of the bearing surface into a corresponding opening in the mounting plate, and is held there by means of a spring-loaded retaining means. The rail fastening system is thus pre-mounted is compacted by vibration into a concrete bed that is still fluid. After the concrete has set, a tensioning screw is introduced through the mounting plate into the dowel.

According to the state of the art described above, the dowels are introduced into the base plate from below and locked in place. During pouring, the concrete generates a buoyancy force which acts from below on the base plate and pushes it upwards. At the same time, the dowels are held in place by the concrete, as they sit deep in the concrete as a result of their length. For this reason, there is a risk that a dowel will come loose from the base plate and the concrete will unintentionally flow between the base plate and the dowel. A correction after the concrete has hardened is time-consuming and expensive. A further problem is that the dowel cannot be easily replaced after the mounting plate has been cast, for example in the event of damage. As a result, prior to any removal of the dowel, the base plate must first be broken out of the concrete. However, as the dowel is locked into the base plate from below and is cast deep into the concrete, dismantling can lead to severe damage to the concrete body.

SUMMARY

One object of the invention is to provide a rail fastening system for fastening a rail to a rail subsurface, which has improved reliability and/or durability and/or maintainability.

The object is achieved with a rail fastening system and a method as claimed.

The rail fastening system is used for the detachable fastening of a rail on a rail subsurface. The rail subsurface is preferably a concrete bed for a ballastless track, but can also be a railway tie or other suitable rail subsurface. The rail fastening system has a base plate, preferably made of plastic, and at least one dowel. The base plate is preferably a mounting plate for the connection of components for fastening the rail. The base plate has at least one opening, which completely penetrates the base plate in the thickness direction. In other words, the opening is a through-hole. The thickness direction—when viewed in the mounted state of the base plate—means the vertical direction; that is, the direction of gravity. The dowel is introduced into the opening, is held in place by a retaining contour and projects in the thickness direction at least on one side beyond the base plate.

Since the opening is a through-hole in the thickness direction of the base plate, the dowel can be unscrewed from the top of the base plate at a later point in time, for example after overmolding or casting with concrete or placing in a concrete bed. This improves the reliability and maintainability of the rail fastening system. In particular, the partial or complete destruction of the concrete bed is not required. The dowel will not be deformed, structurally weakened or damaged when introduced into the opening of the base plate, and the same applies to the base plate, thus improving the durability of the rail fastening system. Furthermore, since the opening is accessible from both sides, the dowel can be introduced into the opening from above and held securely in the direction of gravity by the retaining contour, thus reducing the risk of the dowel coming loose when pouring the concrete, even if different buoyancy forces are applied to the base plate and the dowel.

Preferably, the base plate has a mounting surface for connecting one or more components for rail fastening and a bearing surface opposite the mounting surface in the thickness direction, wherein the opening penetrates the mounting surface and bearing surface, or opens into it, and the dowel projects from the base plate on the side of the bearing surface. The mounting surface is preferably profiled; that is, it has elevations and recesses. It can have a horizontal or inclined rail support section on which the rail rests in the mounted state, if applicable via a damping and/or springing intermediate layer. The mounting surface can alternatively or additionally have one or more receptacles, which are designed as recesses and are configured to accommodate angled guide plates. The angled guide plates, in turn, can be used together with tensioning clamps, which are curved steel springs, to hold the rail in a force-fitting and elastic manner. For this purpose, the tensioning clamps are preferably each screwed over an angled guide plate by means of a tensioning screw in such a manner that a retaining section of the tensioning clamp presses on a rail foot of the rail in a springing elastic manner.

Preferably, the dowel is introduced into the opening of the base plate from the side of the mounting surface, which allows the rail fastening system to be maintained in a particularly time-saving and cost-saving manner, for example by replacing the dowel.

Preferably, the bearing surface has a ribbed structure, by which the base plate interlocks with the concrete and is anchored particularly securely.

Preferably, to realize the retaining contour, the opening has an internal thread and/or the dowel has an external thread, that can be configured in such a manner that the dowel can be screwed into and unscrewed from the side of the mounting surface in the opening. In this manner, not only is a reliable locking of the dowel in the opening achieved, but the dowel and base plate are pre-mounted without any deformation, damage or other structural weakening arising. Thereby, the reliability of the rail fastening system is further improved. In addition, the dowel can be easily unscrewed later using a tool, without any damages to the rail subsurface arising. It should be noted that, in special embodiments, one of the two threads mentioned can be dispensed with if it is still possible to screw the dowel in and out.

Preferably, the external thread has two sections of different thread characteristics—such as flank shape, flank distance, core diameter, nominal diameter, etc.—to accommodate different requirements for holding in the opening and locking in the concrete bed or another rail subsurface.

To realize the retaining contour, the dowel preferably has, alternatively or in addition to the thread structure, a dowel head with a diameter exceeding the smallest diameter of the opening. This means that the dowel can be introduced into the opening from above without any problems, and at the same time it can be secured particularly securely against unintentional release when introduced into a concrete bed or overmolded with concrete.

Preferably, the base plate sits 8 to 15 mm deep in the concrete bed in the thickness direction and/or the dowel reaches 120 mm deep or deeper into the concrete bed, thus providing a reliable retaining for the rail, while at the same time allowing the maintenance of the rail fastening system.

Preferably, the base plate has several, particularly preferably two, openings that penetrate the base plate completely in the thickness direction, and the rail fastening system has several, particularly preferably two, dowels that are introduced into the openings accordingly, are held therein by means of a retaining contour in each case and project beyond the base plate in the thickness direction. On the one hand, this improves the anchoring of the base plate in the concrete bed and, on the other hand, the multiple dowels can be used in a synergetic manner for rail fastening and/or connecting other components. Thus, in the case of two dowels, the rail can be fastened to the base plate on both sides, for example by tensioning two tensioning clamps, if applicable with intermediate angled guide plates.

The method in accordance with the disclosure serves to manufacture a rail fastening system as described above. Thereby, the dowel (analogously several dowels) is introduced into the corresponding opening in such a manner that it is held therein by means of the retaining contour and projects in the thickness direction of the base plate at least on one side over the base plate. The method realizes the pre-mounting of the rail fastening system.

The features, technical effects, advantages and exemplary embodiments described in relation to the rail fastening system apply analogously to its manufacturing process.

Thus, according to a particularly preferred embodiment, the dowel is introduced into the opening from above, that is, from the side of the mounting surface, so that it projects downwards, that is, on the side of the bearing surface, above the base plate. Furthermore, pre-mounting is preferably carried out in such a manner that the dowel and/or base plate is not deformed, in particular not weakened, when the dowel is introduced into the opening. If deformation of the base plate according to a particularly preferred embodiment is ruled out, this includes the fact that parts of the base plate, such as the retaining contour, are also not deformed.

Further advantages and features of the present invention can be seen from the following description of preferred exemplary embodiments. The features described there may be implemented on their own or in combination with one or more of the features set out above, provided that the features are not contradictory. The following description of the preferred exemplary embodiments is given with reference to the accompanying drawings.

BRIEF DESCRIPTION OF THE DRAWINGS

FIG. 2 shows a schematic cross-section of the base plate of the rail fastening system of FIG. 1.

FIG. 3 shows a schematic top view of the base plate of the rail fastening system in FIG. 1.

DETAILED DESCRIPTION

Figure 1:
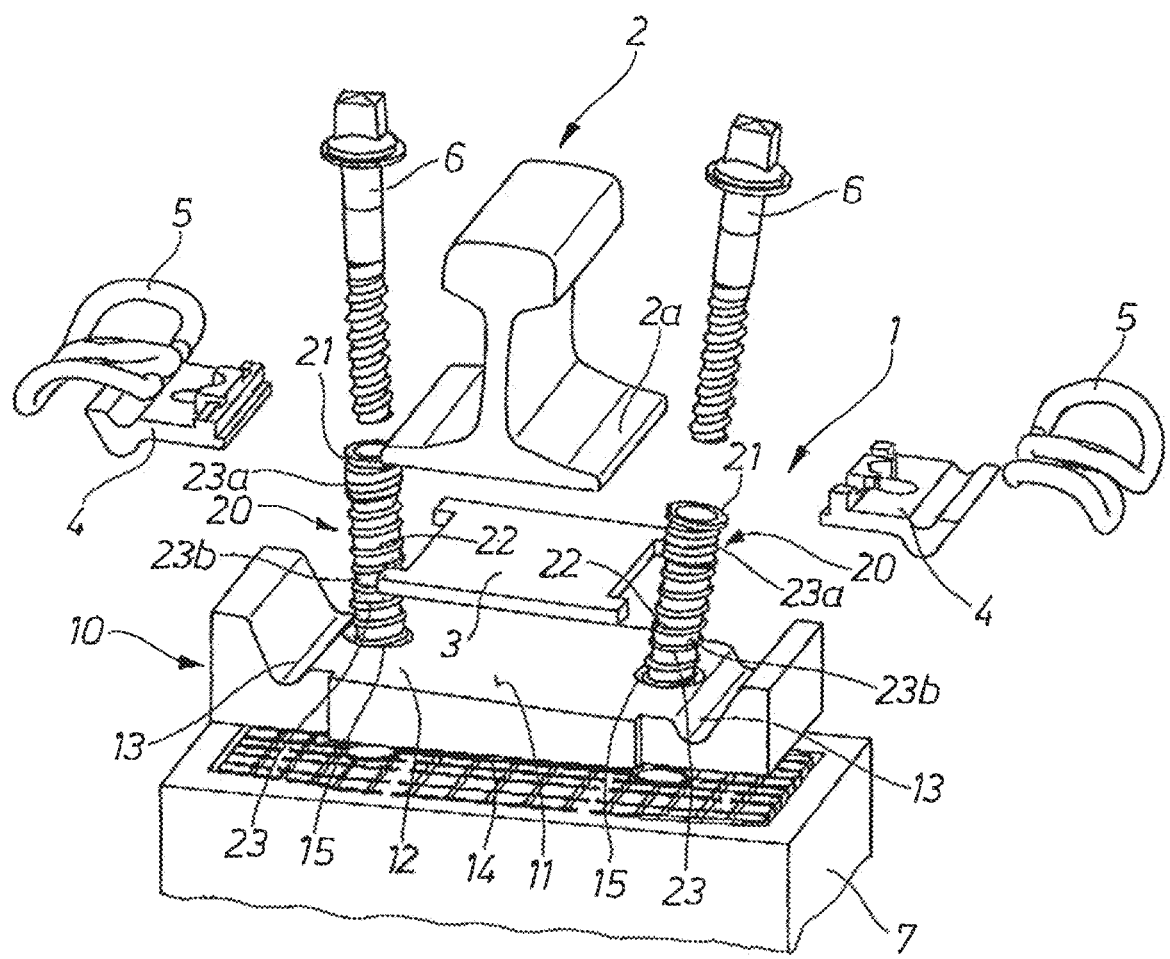
FIG. 1 is a perspective view, partially extended, which shows a rail fastening system, a rail to be fastened to it and a concrete bed.

In the following, preferred exemplary embodiments are described using the figures. Thereby, elements in the figures that are identical, are similar or have similar effects are marked with identical reference signs, and a repeated description of such elements is sometimes omitted in order to avoid redundancies.

FIG. 1 shows a rail fastening system 1, which has a base plate 10 and two dowels 20 connected to it.

In the present exemplary embodiment, the base plate 10 is a mounting plate with a profiled mounting surface 11 for fastening a rail 2. For this purpose, the mounting surface 11 has an inclined rail support section 12, on which the rail 2 rests in the fastened state, if applicable via a damping and/or a springing intermediate layer 3. The mounting surface 11 also has receptacles 13, which are configured to accommodate angled guide plates 4. In turn, the angled guide plates 4, together with tensioning clamps 5, which are curved steel springs, are used to hold the rail 2 in a force-fitting and elastic manner. For this purpose, the tensioning clamps 5 are each screwed over an angled guide plate 4 by means of a tensioning screw 6 in such a manner that a retaining section of the tensioning clamp 5 presses on the rail foot 2a of the rail 2 in a springing elastic manner.

Although, in the present exemplary embodiment, the base plate 10 is a mounting plate of the type described above, the base plate 10 can also be designed in another manner. For example, the base plate 10 can be a system frame. The base plate 10 serves the purpose of connecting components—for example, rail 2, intermediate layer 3, angled guide plate 4, tensioning clamp 5 and/or tensioning screws 6—to a concrete bed 7, which serves as a rail support in the present exemplary embodiment. In addition to the profiling (elevations and recesses) of the mounting surface 11, the base plate 10 has a bearing surface 14 on the side of the concrete bed 7, that is, on the underside, which preferably has a ribbed structure, by which the base plate 10 interlocks with the concrete.

The base plate 10 is preferably made of a plastic material, but can also be made of another material, for example metal or metal alloy.

The base plate 10 has one or more openings 15 (two in this exemplary embodiment) to accommodate the dowels 20. The openings 15 are designed as through-holes, that is, they penetrate the base plate 10 completely in the vertical direction, by which the dowels 20 can be introduced into the corresponding openings 15 from above (viewed in the mounted state). The dowels 20 are locked in their openings 15 along the direction of gravity (viewed in the installed state) by means of a retaining structure; that is, they cannot be easily pulled out of the openings 15 downwards, in particular not without being destroyed. For this purpose, the dowel 20 can have a dowel head 21, the structure of which is different from the dowel shank 22 of the dowel 20; in particular, the dowel head 21 can have a larger diameter than the dowel shank 22. In particular, the diameter of the dowel head 21 can be larger than the smallest diameter of the opening 15.

Preferably, the dowel 20 is screwed into the corresponding opening 15. In such a case, the dowel 20 has an external thread 23. The external thread 23 in turn can have a head thread section 23a and a shank thread section 23b, whose thread characteristics—such as flank shape, flank distance, core diameter, nominal diameter, etc.—are different. In the case of the screwable dowel 20, the openings 15 preferably have corresponding internal threads 16. The internal thread 16 and the external thread 23, in particular the head thread section 23a, are matched to each other such that a secure and durable screw connection is ensured. The thread pairing is designed such that a secure seal against rising concrete is ensured.

The internal threads 16 of the openings 15 are shown schematically in the cross-sectional view of the base plate 10 in accordance with FIG. 2. A top view of the base plate 10 of the rail fastening system 1 is shown in FIG. 3.

The rail fastening system 1 consisting of a base plate 10 and dowel(s) 20 is preferably pre-mounted or partially pre-mounted; that is, the dowel(s) 20 are introduced into the base plate 10 before the rail fastening system is anchored in the concrete bed 7 or overmolded with concrete. It should be noted that one or more of the components presented above— for example, angled guide plate(s) 4 and tensioning clamp(s) 5—can be considered as part of the rail fastening system 1.

After the pre-mounting of the rail fastening system 1, the base plate 10 with the pre-mounted dowels 20 is poured into liquid concrete of the concrete bed 7 or overmolded with concrete for the final mounting according to the present design. After curing, the base plate, for example, sits 8 to 15 mm deep in the concrete. The dowel 20 reaches deeper into the concrete, for example 120 mm or more.

Since the dowels 20 are introduced into the openings 15 from above and securely locked in the direction of gravity, the dowels 20 cannot come loose when pouring the concrete, even if different buoyancy forces act on the base plate 10 and the dowels 20. The dowel 20 is neither deformed nor structurally weakened or damaged when introduced into the opening 15; the same applies to the base plate 10, by which the durability of the rail fastening system 1 is improved. In particular, there is no deformation of the retaining structure. Furthermore, the dowels 20 can be removed (preferably, unscrewed) from the top of the base plate 10 at a later point in time, for example due to wear or damage. The partial or complete destruction of the concrete bed 7 is not necessary.

To the extent applicable, all individual features shown in the exemplary embodiments may be combined and/or exchanged without leaving the field of the invention.

LIST OF REFERENCE SIGNS

1 Rail fastening system
2 Rail
2a Rail foot
3 Intermediate layer
4 Angled guide plate
5 Tensioning clamp
6 Tensioning screw
7 Concrete bed
10 Base plate
11 Mounting surface
12 Rail support section
13 Receptacle
14 Support surface
15 Opening
16 Internal thread
20 Dowel
21 Dowel head
22 Dowel shank
23 External thread
23a Thread head section
23b Thread shank section

The invention claimed is:

1. A rail fastening system (1) for fastening a rail (2) to a rail subsurface, comprising:
  a base plate (10); and
  at least one dowel (20),
  wherein the base plate (10) has at least one opening (15) which completely penetrates the base plate (10) in a thickness direction,
  wherein the at least one dowel (20) is introduced into the opening (15), is held in the opening (15) by a retaining contour, and projects in a thickness direction at least on one side beyond the base plate (10),
  wherein the base plate (10) has
    a mounting surface (11) for connecting one or more components for rail fastening and
    a bearing surface (14) opposite the mounting surface (11) in the thickness direction,
  wherein the opening (15) penetrates the mounting surface (11) and the bearing surface (14) and the dowel (20) projects beyond the base plate (10) on the side of the bearing surface (14),
  wherein, in order to realize the retaining contour, the opening (15) has an internal thread (16) and/or the dowel (20) has an external thread (23), which is configured in such a manner that the dowel (20) can be screwed into the opening (15) from a side of the mounting surface (11).

2. The rail fastening system (1) according to claim 1, wherein the rail subsurface is a ballastless track.

3. The rail fastening system (1) according to claim 1, wherein the base plate (10) is made of a plastic.

4. The rail fastening system (1) according to claim 1, wherein the dowel (20) is introduced into the opening (15) from the side of the mounting surface (11).

5. The rail fastening system (1) according to claim 1, wherein the mounting surface (11) comprises
  a rail support section (12) which is configured to support the rail (2) and/or
  one or more receptacles (13), which are configured to accommodate angle guide plates (4).

6. The rail fastening system (1) according to claim 1, wherein the mounting surface (11) comprises an inclined rail support section (12) which is configured to support the rail (2) via a damping and/or springing intermediate layer (3).

7. The rail fastening system (1) according to claim 1, wherein the bearing surface (14) has a ribbed structure.

8. The rail fastening system (1) according to claim 1,
  wherein the dowel has the external thread, and
  wherein the external thread (23) has two sections of different thread characteristics.

9. The rail fastening system (1) according to claim 1, wherein the dowel (20) has a dowel head (21), a diameter of which exceeds a smallest diameter of the opening (15).

10. The rail fastening system (1) according to claim 1, wherein a tensioning screw (6) is screwed into the dowel (20).

11. The rail fastening system (1) according to claim 10, wherein a tensioning clamp (5) is screwed by the tensioning screw (6) in such a manner that a retaining section of the tensioning clamp (5) presses on a rail foot (2a) of the rail (2) in a springing elastic manner.

12. The rail fastening system (1) according to claim 1, wherein the base plate (10) and the dowel (20) are at least partially anchored in a concrete bed (7) or are at least partially overmolded by concrete.

13. The rail fastening system (1) according to claim 12, wherein the base plate (10) is seated in the concrete bed (7) 8 to 15 mm deep in the thickness direction, and/or wherein the dowel (20) extends 120 mm deep or deeper into the concrete bed (7).

14. The rail fastening system (1) according to claim 1, wherein the base plate (10) has two openings (15) which completely penetrate the base plate (10) in the thickness direction, and
wherein the rail fastening system (1) has two dowels (20) which are correspondingly introduced into the two openings (15), are held therein in each case by a retaining contour and project beyond the base plate (10) in the thickness direction.

15. A method for producing a rail fastening system, comprising:
providing the rail fastening system according to claim 1,
wherein the dowel (20) is introduced into the opening (15) in such a manner that it is held therein by the retaining contour and projects in the thickness direction of the base plate (10) at least on one side beyond the base plate (10).

16. The method according to claim 15,
wherein the base plate (10) has a mounting surface (11) for connecting one or more components for rail fastening and a bearing surface (14) opposite the mounting surface (11) in the thickness direction, and
wherein the dowel (20) is introduced into the opening (15) from the side of the mounting surface (11) in such a manner that it projects beyond the base plate (10) on the side of the bearing surface (14).

17. The method according to claim 15,
wherein the dowel (20) and/or the base plate (10) are not deformed when the dowel (20) is introduced into the opening (15).

18. The method according to claim 15,
wherein no deformation of the retaining contour does not take place when the dowel (20) is introduced and held in the opening (15), and
wherein the dowel is embedded in concrete and can be removed or replaced without damaging the concrete.

* * * * *